United States Patent
Ossowska et al.

(10) Patent No.: US 9,952,320 B2
(45) Date of Patent: Apr. 24, 2018

(54) METHOD FOR OPERATING A RADAR SENSOR OF A MOTOR VEHICLE, DRIVER ASSISTANCE DEVICE AND MOTOR VEHICLE

(71) Applicant: VALEO Schalter und Sensoren GmbH, Bietigheim-Bissingen (DE)

(72) Inventors: Alicja Ossowska, Pforzheim (DE); Urs Luebbert, Bietigheim-Bissingen (DE)

(73) Assignee: VALEO Schalter und Sensoren GmbH, Bietigheim-Bissingen (DE)

( * ) Notice: Subject to any disclaimer, the term of this patent is extended or adjusted under 35 U.S.C. 154(b) by 243 days.

(21) Appl. No.: 14/440,936

(22) PCT Filed: Sep. 18, 2013

(86) PCT No.: PCT/EP2013/069399
§ 371 (c)(1),
(2) Date: May 6, 2015

(87) PCT Pub. No.: WO2014/072107
PCT Pub. Date: May 15, 2014

(65) Prior Publication Data
US 2015/0301172 A1     Oct. 22, 2015

(30) Foreign Application Priority Data
Nov. 8, 2012 (DE) .................. 10 2012 021 973

(51) Int. Cl.
*G01S 13/93* (2006.01)
*G01S 7/02* (2006.01)
(Continued)

(52) U.S. Cl.
CPC ............ *G01S 13/931* (2013.01); *G01S 7/023* (2013.01); *G01S 7/28* (2013.01); *G01S 13/343* (2013.01);
(Continued)

(58) Field of Classification Search
CPC ...................................................... G01S 13/931
(Continued)

(56) References Cited

U.S. PATENT DOCUMENTS

2003/0187578 A1* 10/2003 Nishira ................. B60T 7/16
701/301
2004/0130482 A1 7/2004 Lin et al.
(Continued)

FOREIGN PATENT DOCUMENTS

DE    10 2006 020943 A1    11/2007
DE    10 2009 057 191 A1    6/2011
(Continued)

OTHER PUBLICATIONS

International Search Report in corresponding PCT/EP2013/069399 dated Dec. 20, 2013 (3 pages).

*Primary Examiner* — Timothy A Brainard
(74) *Attorney, Agent, or Firm* — Osha Liang LLP

(57) ABSTRACT

The invention relates to a method for operating a radar sensor (5, 6) of a motor vehicle (1), in which for detecting a target object (12) in an environment of the motor vehicle (1), a transmit signal (S) is emitted by means of the radar sensor (5, 6) and an echo signal reflected on the target object (12) is received as a received signal, wherein a plurality of sequences (13) each including a plurality of frequency-modulated chirp signals (14) is emitted one after the other by means of the radar sensor (5, 6) as the transmit signal (S), and wherein a transmission pause (15) respectively follows each sequence (13), in which the radar sensor (5, 6) does not emit any chirp signals (14). The period of time of the transmission pauses (15) is respectively randomly adjusted in the operation of the radar sensor (5, 6).

15 Claims, 2 Drawing Sheets

Figure 1:
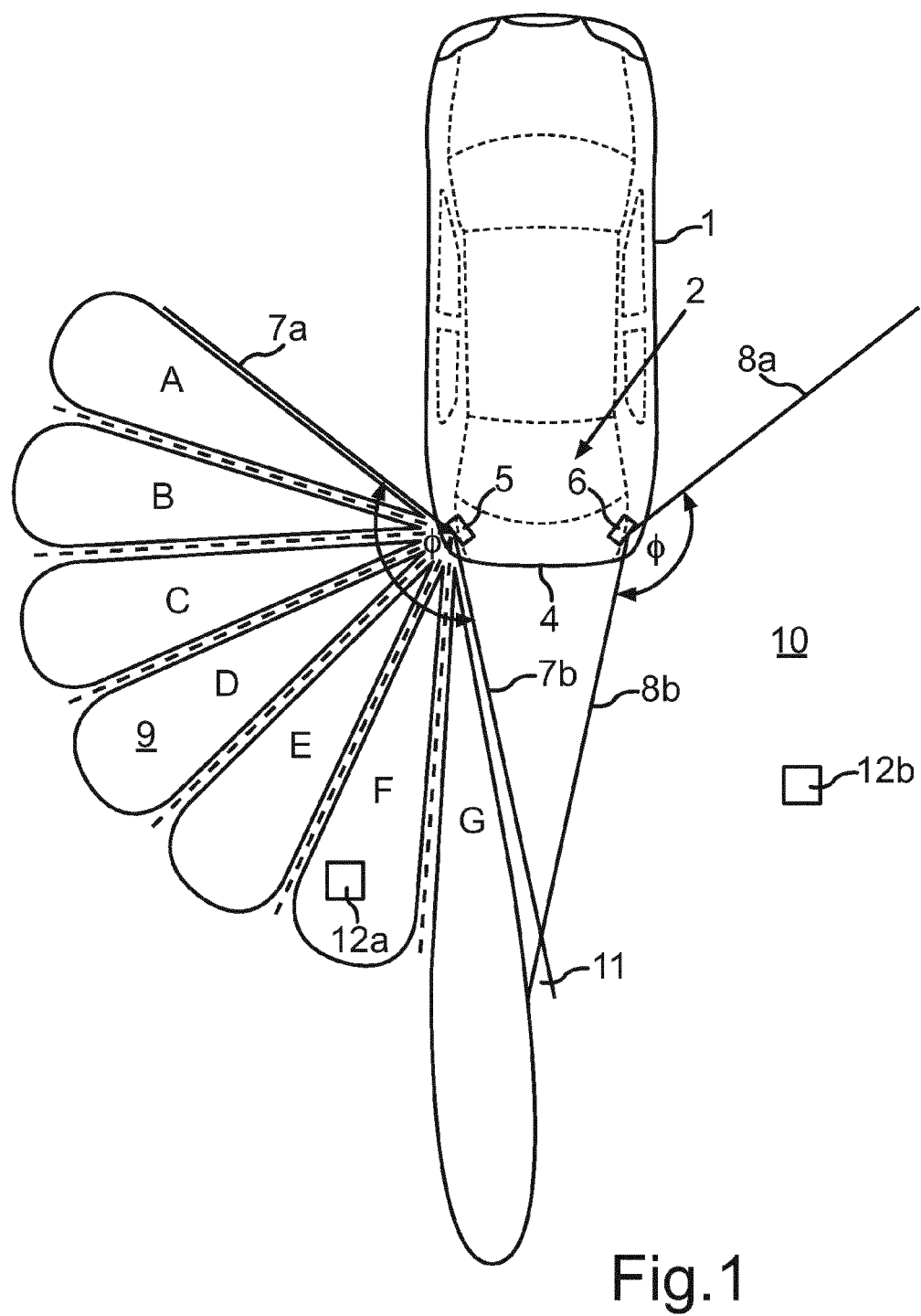

(51) Int. Cl.
*G01S 13/34* (2006.01)
*G01S 13/87* (2006.01)
*G01S 7/28* (2006.01)

(52) U.S. Cl.
CPC ..... *G01S 13/878* (2013.01); *G01S 2013/9378* (2013.01); *G01S 2013/9385* (2013.01); *G01S 2013/9389* (2013.01)

(58) Field of Classification Search
USPC .......................................................... 342/70
See application file for complete search history.

(56) References Cited

U.S. PATENT DOCUMENTS

| | | | | |
|---|---|---|---|---|
| 2010/0164806 A1* | 7/2010 | Pillai | .................... | G01S 13/106 342/385 |
| 2012/0176266 A1* | 7/2012 | Lee | ......................... | G01S 7/023 342/27 |
| 2012/0194377 A1* | 8/2012 | Yukumatsu | ........... | G01S 13/931 342/70 |

FOREIGN PATENT DOCUMENTS

| | | |
|---|---|---|
| EP | 1 840 595 A2 | 10/2007 |
| EP | 1 873 551 A1 | 1/2008 |
| EP | 2 180 336 A2 | 4/2010 |

\* cited by examiner

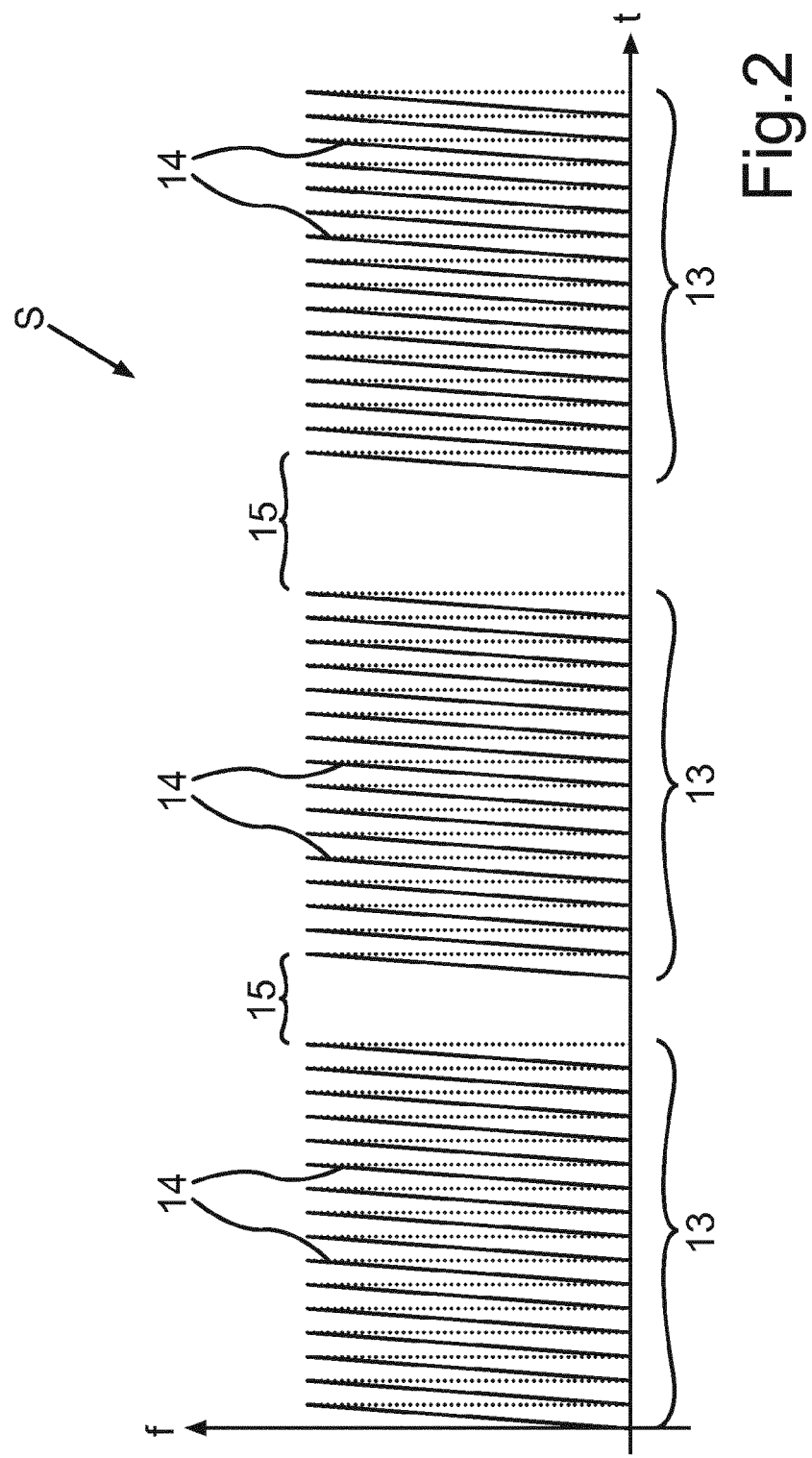

METHOD FOR OPERATING A RADAR SENSOR OF A MOTOR VEHICLE, DRIVER ASSISTANCE DEVICE AND MOTOR VEHICLE

The invention relates to a method for operating a radar sensor of a motor vehicle, in which for detection of a target object in an environment of the motor vehicle, a transmit signal is emitted by means of the radar sensor and an echo signal is received from the target object as the received signal. As the transmit signal, a plurality of temporal sequences (so-called "bursts") each including a plurality of frequency-modulated chirp signals is emitted one after the other by means of the radar sensor. A transmission pause respectively follows each sequence, in which the radar sensor does not emit any chirp signals. In addition, the invention relates to a driver assistance device, which is formed for performing such a method, as well as to a motor vehicle with such a driver assistance device.

Radar sensors for motor vehicles (automotive radar sensors) are already prior art and are for example operated at a frequency of ca. 24 GHz or ca. 79 GHz. Radar sensors generally serve for detecting target objects in the environment of the motor vehicle and support the driver in driving the motor vehicle in various manner. On the one hand, radar sensors measure the distance between the target object and the vehicle. On the other hand, they also measure both the relative velocity to the target object and the so-called target angle, i.e. an angle between an imagined connecting line to the target object and a reference line, for instance the vehicle longitudinal axis.

Radar sensors are usually placed behind the bumper, for example in the respective corner regions of the bumper. For detecting the target object, the radar sensor emits a transmit signal (electromagnetic waves), which is then reflected on the target object to be detected and received by the radar sensor as radar echo. Therein, the interest is presently directed to the so-called "frequency modulated continuous wave radar" or "FMCW radar", in which the emitted signal includes several sequences (bursts) of frequency-modulated chirp signals, which are emitted one after the other. Correspondingly, the received signal of the radar sensor also includes such a plurality of sequences each having a plurality of chirp signals, which are processed and evaluated with regard to the above mentioned measured variables. Therein, the received signal is first mixed down to the baseband and subsequently converted into a digital received signal with a plurality of samples by means of an analog-digital converter. The samples of the received signal are then processed by means of an electronic computing device (digital signal processor), which can be integrated in the radar sensor.

The invention is for example based on a radar sensor as it is already known from the document DE 10 2009 057 191 A1. The radar sensor is a frequency-modulated continuous wave radar sensor, which emits a temporal succession of sequences each having a plurality of linear frequency-modulated chirp signals (so-called "chirps") as the transmit signal. The received signal of the radar sensor therefore also includes a corresponding plurality of sequences of frequency-modulated chirp signals.

With a radar sensor, typically, a relatively wide azimuth angle range is covered in horizontal direction, which can even be 150°. Thus, the radar sensor has a relatively large azimuth detection angle such that the field of view or the detection range of the radar sensor in azimuth direction is correspondingly wide. The azimuth detection angle is usually symmetrical with respect to a radar axis extending perpendicularly to the front sensor area such that the azimuth detection angle is dimensioned from for example −75° to +75° with respect to the radar axis. This azimuth detection range can be divided in smaller partial ranges, which are irradiated one after the other by the radar sensor. For this purpose, for example, the main lobe of the transmitting antenna is electronically pivoted in azimuth direction, for example according to the phase array principle. In this case, the receiving antenna can have a receive characteristic in azimuth direction, with which the entire azimuth detection range is covered.

With such a wide azimuth detection range of the radar sensor, it can prove problematic that the radar sensor is exposed to various interference signals, which originate from different spatial directions and are superimposed on the received signal of the radar sensor. The received signal thus includes not only the useful signal and accordingly not only the transmit signal originally emitted by the radar sensor, but is additionally also affected by interference signals. These interference signals are superimposed on the received signal of the radar sensor and can e.g. originate from other radar sensors. On the one hand, for example, radar devices of the police can constitute a disturbance source, the signals of which are superimposed on the useful signal of the own radar sensor as interference signals. On the other hand, radar sensors of other motor vehicles can also be operated at the same frequency and thus also constitute interference sources, which affect the signal of the own sensor.

Thus, it can occur that interference signals of external radar are superimposed on the radar signal of the sensor and can therefore impair the mode of operation of the sensor. If the respective sequences of chirp signals are for example emitted at the same time by the sensor and by the external radar, thus, in the worst case, temporary failure of the sensor can occur. Accordingly, there is a particular challenge in preventing the interference.

For avoiding interference, in the document EP 1 873 551 A1, it is proposed to randomly vary the parameters of the individual chirp signals. However, it has turned out that such a variation of the parameters of individual chirp signals is not sufficient to be able to completely or at least predominantly exclude the interference between signals of radar sensors of the same vehicle. In addition, such a variation of the parameters for the individual chirp signals is relatively expensive and associated with a relatively great computational effort in the operation of the motor vehicle because the temporal distance between two adjacent chirp signals is typically very small and usually is in the microsecond range.

It is an object of the invention to demonstrate a solution, how in a method of the initially mentioned kind, the probability of interference in the received signal of the radar sensor, in particular the probability of the mutual influence of two sensors of one and the same vehicle, can be reduced compared to the prior art.

According to the invention, this object is solved by a method, by a driver assistance device as well as by a motor vehicle having the features according to the respective independent claims. Advantageous implementations of the invention are the subject matter of the dependent claims, of the description and of the figures.

In a method according to the invention for operating an automotive radar sensor of a motor vehicle, for detecting a target object in an environment of the motor vehicle, a transmit signal is emitted by means of the radar sensor. An echo signal reflected on the target object is received by the radar sensor as a received signal. Multiple sequences ("bursts") are emitted one after the other as the transmit signal, which each include a plurality (e.g. 16 to 64) of frequency-modulated chirp signals. A transmission pause respectively follows each sequence, in which chirp signals are not emitted by the radar sensor. The period of time of the transmission pauses is respectively randomly adjusted in the operation of the radar sensor.

The period of time of the respective transmission pauses is therefore respectively randomly adjusted after each sequence such that the time of transmission of the respective sequences is also random. In this manner, the probability of an interference of the radar signal is considerably reduced compared to the prior art. The influence of the mode of operation of the radar sensor by an external sensor is therefore basically avoided. Namely, the radar sensor of the motor vehicle and a radar sensor of another vehicle are prevented from simultaneously emitting the respective sequences of chirp signals. The probability of an "inter-automotive" interference is therefore reduced. In particular, the probability of long interference over more than one burst is significantly reduced. If applicable, also two radar sensors of the same motor vehicle can be prevented from simultaneously and synchronously emitting a sequence of chirp signals, so that the probability of mutual interference is considerably reduced compared to the prior art, too.

By a "random" adjustment, presently, in particular a pseudo-random and/or a true or real random adjustment are understood. The term "random" can therefore encompass both "pseudo-random" and "really random". With pseudo-random numbers, for example, a random number generator can be implemented such that the period of time of the respective transmission pauses is for example determined based on a random function. Herein, either a new number can respectively be generated or a plurality of possible numbers can be stored in the computing device, from which a number is randomly selected. With real random numbers, the respective period of time of the transmission pauses can for example be adjusted depending on the power of the received signal.

Preferably, the random period of time of the transmission pauses is respectively adjusted greater than a preset minimum period of time. By providing such a minimum period of time, a reliable and proper operation of the radar sensor is always ensured. Namely, this minimum period of time makes sure that two immediately successively received sequences of chirp signals do not disturb each other. After receiving the sequences of chirp signals, the received sequences are filtered one after the other by means of a filter, which has a preset bandwidth (the so-called system bandwidth). Depending on this system bandwidth, thus, the minimum period of time of the transmission pauses is determined.

Preferably, the period of time of the transmission pauses is respectively determined by addition of a preset and thus constant portion common to all of the transmission pauses, which corresponds to the minimum period of time, as well as of a portion, which is respectively randomly adjusted in the operation of the radar sensor. Thus, a random number is added to the minimum period of time and therefore a random period of time of the transmission pause is determined altogether. Thus, the minimum period of time is always observed on the one hand; it is also achieved that each period of time is randomly adjusted on the other hand.

In order to be able to generate real random numbers, in an embodiment, it is provided that the period of time of the transmission pauses is adjusted depending on the received signal, in particular on the power of the received signal. Thus, real random numbers are present, and the probability of interference is minimal. Therein, the power of at least one subset of samples of a chirp signal of that sequence can for example be considered, which was received directly before the transmission pause, which is to be currently adjusted. However, the power of other chirp signals can also be considered.

Preferably, the random portion is therein adjusted depending on the received signal, and this random portion is added to the constant portion, which corresponds to the minimum period of time.

For determining the random portion, for example, at least one sample, in particular a plurality of samples, of the received signal can be used. Then, the random portion can be generated from these samples according to a predetermined function, e.g. also a logic function. E.g. a modulo function and/or an XOR operation can be provided as the function.

In an embodiment, it is provided that two radar sensors of the motor vehicle—in particular two identical radar sensors—are simultaneously operated and herein emit respective transmit signals each having a plurality of sequences of chirp signals. At least in one of the radar sensors, the period of time of the transmission pauses between each two temporally adjacent sequences is randomly adjusted in the operation of the radar sensor, namely in particular in the above described manner. Thus, it can be excluded that the two radar sensors begin to emit the respective sequences of chirp signals at the same point of time such that the probability of the mutual interference is also very low. This probability can be further minimized if the period of time of the respective transmission pauses is randomly adjusted in both radar sensors.

Optionally, it can also be provided that an at least unidirectional data communication is performed between the two radar sensors, and at least one of the radar sensors communicates data to the other sensor within the scope of this data communication. This data can include information about the randomly adjusted period of time of the current transmission pause and/or about the point of time of emission of a sequence of chirp signals, in particular of the next sequence. The other radar sensor receiving this data can therefore make sure that the two radar sensors are desynchronized and thus the respective sequences of chirp signals are emitted at different points of time. Thus, the probability of interference is further reduced.

Preferably, the radar sensor is a frequency-modulated continuous wave radar sensor. The frequency-modulated chirp signals are signals, the frequency of which is preferably linearly varied in sawtooth-shaped manner between a first value and a second value. The radar sensor can also be a multibeam radar sensor, the horizontal field of view of which is divided in multiple smaller partial ranges in azimuth direction, which are stepwise irradiated one after the other by the radar sensor. This means that the main lobe of the transmitting antenna of the radar sensor can be electronically pivoted in azimuth direction. For each partial range (and thus for each beam), preferably, a sequence of chirp signals (e.g. 16 to 64 chirp signals) is respectively emitted such that the transmission pause between two temporally adjacent sequences corresponds to the pause between the illumination of two different, in particular adjacent, partial ranges.

A driver assistance device according to the invention for a motor vehicle includes a radar sensor as well as an electronic computing device, which e.g. can also be integrated in the radar sensor. The driver assistance device is formed for performing a method according to the invention.

A motor vehicle according to the invention, in particular a passenger car, includes a driver assistance device according to the invention.

The preferred embodiments presented with respect to the method according to the invention and the advantages thereof correspondingly apply to the driver assistance device according to the invention as well as to the motor vehicle according to the invention.

Further features of the invention are apparent from the claims, the figures and the description of figures. All of the features and feature combinations mentioned above in the description as well as the features and feature combinations mentioned below in the description of figures and/or shown in the figures alone are usable not only in the respectively specified combination, but also in other combinations or else alone.

Now, the invention is explained in more detail based on a preferred embodiment as well as with reference to the attached drawings.

There show:

FIG. 1 in schematic illustration a motor vehicle with a driver assistance device according to an embodiment of the invention; and FIG. 2 a temporal progress of the frequency of a transmit signal of a radar sensor.

A motor vehicle 1 illustrated in FIG. 1 is for example a passenger car. The motor vehicle 1 includes a driver assistance device 2 assisting the driver in driving the motor vehicle 1. For example, it can be a blind spot warning and/or a lane change assist and/or a cross traffic alert and/or a door opening assist and/or a rear pre-crash.

Two radar sensors 5, 6 are associated with the driver assistance device 2, which are disposed behind a rear bumper 4 of the motor vehicle 1. The first radar sensor 5 is disposed in a left rear corner region of the motor vehicle 1, while the second radar sensor 6 is disposed in a right rear corner region. Both radar sensors 5, 6 are located behind the bumper 4 and are therefore not visible from the outside of the motor vehicle 1.

The radar sensors 5, 6 are frequency-modulated continuous wave radar sensors (FMCW) in the embodiment. The radar sensors 5, 6 each have an azimuth detection range $\varphi$, which is bounded by two lines 7a, 7b (for the left radar sensor 5) and 8a, 8b (for the right radar sensor 6), respectively, in FIG. 1. The azimuth detection angle $\varphi$ is for example 150°. By this angle $\varphi$, a field of view 9 and 10, respectively, of the respective radar sensor 5, 6 in azimuth direction and thus in horizontal direction is respectively defined. The fields of view 9, 10 can also overlap each other such that an overlap region 11 exists.

Each radar sensor 5, 6 includes an integrated computing device for example in the form of a digital signal processor, which drives the radar sensor 5, 6 and additionally processes and evaluates the received signals. However, alternatively, an external computing device common to the two sensors 5, 6 can also be provided, which is able to then process the received signals of the two sensors 5, 6.

In their respective fields of view 9, 10, the radar sensors 5, 6 can detect target objects 12a (on the left) and 12b (on the right) external to vehicle. In particular, the radar sensors 5, 6 can determine the distance of the target objects 12a and 12b, respectively, from the respective radar sensor 5, 6 as well as respectively the target angle and the relative velocity of the target objects 12a and 12b, respectively, with respect to the motor vehicle 1—they are measured variables of the radar sensors 5, 6.

With further reference to FIG. 1, the radar sensor 5—and analogously also the sensor 6—can successively irradiate various partial ranges A, B, C, D, E, F, G of the azimuthal field of view 9. These partial ranges A to G represent angular ranges, wherein for successively detecting the partial ranges A to G, for example a transmit lobe of the transmitting antenna of the radar sensor 5 is electronically pivoted in azimuth direction, namely according to the phase array principle. The different orientations of the transmit lobe are schematically indicated for the different partial ranges A to G in FIG. 1. The receiving antennas of the radar sensor 5 overall can have a wide receive characteristic in azimuth direction, with which the entire azimuthal field of view 9 is covered. Other configurations can alternatively realize narrow reception angle ranges in association with wide transmit lobes.

In FIG. 1, for the sake of clarity, only the partial ranges A to G of the field of view 9 of the first radar sensor 5 are illustrated. However, correspondingly, the horizontal field of view 10 of the second radar sensor 6 is here also divided in multiple partial ranges. Although the further description relates to the mode of operation of the first sensor 5, the mode of operation of the second sensor 6 corresponds to that of the first sensor 5.

The number of the partial ranges A to G is only exemplarily illustrated in FIG. 1 and can be different according to embodiment. In the embodiment, a total of seven partial ranges A to G is provided, which are illuminated one after the other by the radar sensor 5.

The mode of operation of the radar sensor 5 is as follows: in a single measurement cycle of the radar sensor 5, the main lobe of the transmitting antenna is once stepwise pivoted from the partial range A up to the partial range G, such that the partial ranges A to G are illuminated one after the other. Therein, for each partial range A to G, a temporal sequence of frequency-modulated chirp signals (chirps) is respectively emitted. First, such a sequence of chirp signals is emitted for the partial range A. After a transmission pause, then, a sequence of chirp signals is emitted to the partial range B. After a further transmission pause, then, the partial range C is irradiated etc. As is apparent from FIG. 1, the radar sensor 5 has a larger reach for the partial range G than for the remaining partial ranges A to F. This is achieved in that the emitted sequence has more chirp signals for the partial range G than for the remaining ranges A to F. While for example 16 chirp signals are emitted within the respective sequence for the partial ranges A to F, for example a total of 64 chirp signals within the sequence is emitted for the partial range G.

The detection of the target objects 12a, 12b is therefore individually and separately effected for each partial range A to G. Thus, it is possible to track the target objects 12a, 12b in the entire field of view 9, 10.

In a single measurement cycle of the radar sensor 5, thus, in the embodiment, a total of seven sequences of frequency-modulated chirp signals is emitted, namely a sequence of 16 chirp signals for the partial ranges A to F respectively as well as a sequence of 64 chirp signals for the partial range G. Correspondingly, the received signals also each include a plurality of chirp signals. The received signal for the partial range A includes—if reflection on a target object occurs—16 chirp signals; the received signal for the partial range B also includes 16 chirp signals, and the respective received signals for the partial ranges C to F also each include 16 chirp signals. By contrast, the received signal from the partial range G includes 64 chirp signals. However, the method can also be applicable in an operation mode, in which all bursts in all partial ranges A to G are of the length of 16 chirps.

Thus, the radar sensor 5 emits a temporal sequence of frequency-modulated chirp signals respectively for each partial range A to G. After each sequence, a transmission pause follows, which corresponds to the pause between the illumination of the adjacent partial ranges A to G. Such a transmit signal S of the radar sensor 5 is exemplarily illustrated in FIG. 2. A progress of the frequency f of the transmit signal S over the time t is shown. The transmit signal S includes several sequences 13 of linearly frequency-modulated chirp signals 14, wherein the sequences 13 are emitted one after the other by the radar sensor 5. Therein, a sequence 13 is respectively emitted for each partial range A to G such that the first sequence 13 of e.g. 16 chirp signals 14 is emitted for the first partial range A, the second sequence 13 of e.g. 16 chirp signals 14 for the second partial range B etc. Only for the last partial range G, more chirp signals 14 within the sequence 13 than for the other partial ranges A to F can be emitted. The transmission pause between two adjacent sequences 13 is denoted by 15 in FIG. 2.

In order to reduce the probability of interference between the transmit signals S of the radar sensors 5, 6 on the one hand and external interference signals on the other hand to a minimum, the period of time of the transmission pauses 15 is randomly adjusted at least in one of the radar sensors 5, 6. These transmission pauses 15 can also be randomly adjusted in both radar sensors 5, 6. Therefore, it is improbable that both radar sensors 5, 6 begin emitting a sequence 13 at the same point of time as an external radar of other vehicle.

The adjustment of the transmission pause 15 can be configured as follows: a minimum period of time of the transmission pause 15 can be preset, which is observed in each transmission pause 15. This minimum period of time preferably results from the following equation:

$$T\min = \frac{Bsys \cdot Tch}{Bch},$$

wherein Tmin denotes the minimum period of time of the transmission pause 15, Bsys denotes the so-called system bandwidth, Tch denotes the period of time of a single chirp signal and Bch denotes the bandwidth of the transmit signal S and thus the frequency swing of the chirp signals 14.

This minimum period of time Tmin corresponds to a constant portion added to a random portion. Therefore, the random determination of the respective transmission pauses 15 is effected by addition of a respectively randomly generated portion on the one hand and the constant portion on the other hand, which corresponds to the minimum period of time Tmin.

For the generation of the random portion, very different embodiments are provided: for example, a random number generator can be implemented, by means of which pseudo-random numbers or real random numbers can be generated. Herein, an upper limit for the random portion can for example also be defined. However, it is also possible to obtain real random numbers by generating the random portion depending on the power of the received signal. In this embodiment, the samples of the received signal are used to generate the random portion of the respective transmission pause 15. This can e.g. be configured such that the samples of the received signal are subjected to a predetermined mathematic or logic operation such as for example the XOR operation or else the modulo operation.

Unidirectional or bidirectional data communication can also be performed between the two radar sensors 5, 6. Within the scope of this data communication, one of the radar sensors 5, 6 can communicate data to the other sensor 5, 6, which includes information about the randomly adjusted current transmission pause 15 and/or about the point of time of emission of the next sequence 13. The radar sensor 5, 6 receiving this data then checks whether potential collision can occur, and optionally makes sure that the mutual points of time of emission of the next sequence 13 are apart from each other. In this way, also two radar sensors 5, 6 of the same motor vehicle can be prevented from simultaneously and synchronously emitting a sequence of chirp signals, so that the probability of mutual interference is considerably reduced, too.

The above mentioned minimum period of time Tmin can for example be ca. 1.25 µs. Such a period of time appears if Tch=0.25 ms, Bch=200 MHz and Bsys=1 MHz.

The invention claimed is:

1. A method for operating a radar sensor of a motor vehicle, comprising:
   performing a detection of a target object in an environment of the motor vehicle by:
   emitting a transmit signal using the radar sensor,
   wherein a plurality of sequences each including a plurality of frequency-modulated chirp signals are emitted, in a target object detection cycle specific to the detection of the target object, one after the other by the radar sensor as the transmit signal, wherein a transmission pause respectively follows each of the plurality of sequences,
   wherein the period of time of the transmission pauses is respectively randomly adjusted in the operation of the radar sensor, and
   receiving an echo signal reflected on the target object as a received signal,
   wherein two radar sensors of the motor vehicle are simultaneously operated and emit respective transmit signals each having a plurality of sequences of chirp signals, wherein at least in one of the radar sensors the period of time of the transmission pauses between each two temporally adjacent sequences is randomly adjusted in the operation of the radar sensor, and
   wherein an at least unidirectional data communication is performed between the radar sensors during the target object detection cycle, and within a scope of the data communication one of the radar sensors communicates data to the other radar sensor, to specify a timing of the randomly adjusted transmission pause between two subsequent sequences within the target object detection cycle.

2. The method according to claim 1, wherein the period of time of the transmission pauses is respectively adjusted greater than a preset minimum period of time.

3. The method according to claim 2, wherein the period of time of the transmission pauses is respectively determined by addition of a preset portion common to all of the transmission pauses, which corresponds to the minimum period of time, and of a random portion, which is respectively randomly adjusted in the operation of the radar sensor.

4. The method according to claim 1, wherein the period of time of the transmission pauses is respectively adjusted depending on a power of the received signal.

5. The method according to claim 1, wherein in both radar sensors, the period of time of the respective transmission pauses between each two temporally adjacent sequences is randomly adjusted in the operation of the radar sensor.

6. The method of claim 1, wherein the timing of the randomly adjusted transmission pause is specified by a duration of the randomly adjusted transmission pause.

7. The method of claim 1, wherein the timing of the randomly adjusted transmission pause is specified by an onset of the upcoming sequence.

8. A driver assistance device for a motor vehicle, comprising:
   a first and a second radar sensor, each radar sensor configured to emit, in a target object detection cycle specific to the detection of a target object, a transmit signal and to receive an echo signal reflected on the target object as a received signal for detecting the target object in an environment of the motor vehicle, wherein the transmit signal comprises a plurality of sequences each including a plurality of frequency-modulated chirp signals, and
   an electronic computing device for adjusting a period of time of transmission pauses between each two temporally adjacent sequences,
      wherein the computing device is adapted to respectively randomly adjust the period of time of the transmission pauses in the operation of at least one of the radar sensors,
      wherein the first and the second radar sensors are configured to simultaneously emit respective transmit signals each having a plurality of sequences of chirp signals, wherein at least in one of the radar sensors the period of time of the transmission pauses between each two temporally adjacent sequences is randomly adjustable in the operation of the radar sensor,
      wherein the first and the second radar sensors are formed for at least unidirectional data communication with each other, during the target object detection cycle, and at least one of the radar sensors is formed for communicating data to the other radar sensor within a scope of the data communication, to specify a timing of the randomly adjusted transmission pause between two subsequent sequences within the target object detection cycle.

9. The driver assistance device according to claim 8, wherein the computing device is adapted to adjust the period of time of the transmission pauses to be greater than a preset minimum period of time.

10. The driver assistance device according to claim 9, wherein the computing device is adapted to respectively determine the period of time of the transmission pauses by addition of a preset portion common to all of the transmission pauses, which corresponds to the minimum period of time, and of a portion, which is respectively randomly adjustable in the operation of the radar sensor.

11. The driver assistance device according to claim 8, wherein the computing device is adapted to adjust the period of time of the transmission pauses respectively depending on a power of the received signal.

12. The driver assistance device according to claim 8, wherein in both radar sensors the period of time of the respective transmission pauses between each two temporally adjacent sequences is randomly adjustable in the operation of the radar sensor.

13. A motor vehicle including a driver assistance device according to claim 8.

14. The driver assistance device according to claim 8, wherein the timing of the randomly adjusted transmission pause is specified by a duration of the randomly adjusted transmission pause.

15. The driver assistance device according to claim 8, wherein the timing of the randomly adjusted transmission pause is specified by an onset of the upcoming sequence.

* * * * *